3,361,366
APPARATUS FOR MIXING SOLID PARTICLES WITH FLUIDS, OR FLUIDS TOGETHER, IN PARTICULAR AT THE BURNERS THEMSELVES, AND APPLICATIONS THEREOF
Marc Marie Paul René de la Fourniere, Paris, France, assignor to Societe Civile d'Etudes, Recherches et Participations E.R.P., Paris, France, a French company
Filed Dec. 15, 1965, Ser. No. 513,947
Claims priority, application France, June 21, 1957, 741,546, Patent 1,287,306
6 Claims. (Cl. 239—406)

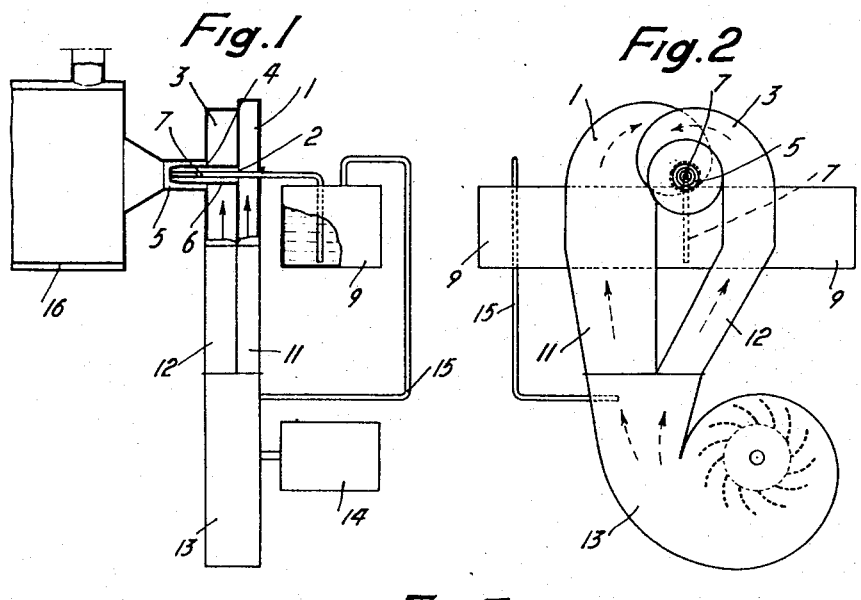
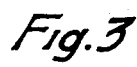
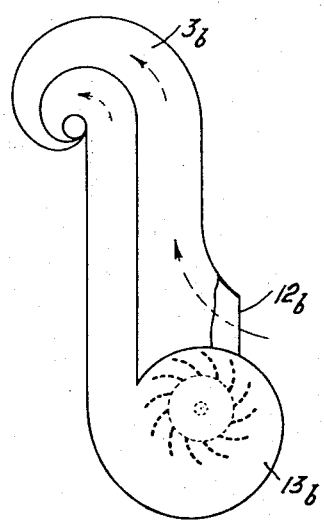

This application is a continuation-in-part application of the U.S. patent application Serial No. 743,171, filed by the same inventor on June 19, 1958.

The present invention has for its object improvements to apparatus for mixing solid particles with fluids, or fluids together, in particular at the burners themselves, these improvements being preferably used in the form of combinations—since it is thus that they provide most advantages—but being also applicable individually without departing from the scope of the invention.

A broad object of my invention is to provide a thorough distribution of a fluid or a fluidized material in a gaseous flow according to the specific mathematical laws governing such flow and no more according to the hazard or statistic laws.

A more specific object of my invention is to provide a distribution of a liquid or of solid particles throughout a gaseous stream having circular parallel cross-sections and all around the axis thereof in such a way that in a cross-section of this stream the quantity of distributed material is the same all around the stream axis at the same distance of this axis, such quantity varying from one cross-section to the next one along said axis, and also in any cross-section in dependence on the distance from the stream axis.

A further object of my invention is to provide all around the stream axis a stoichiometric surface of revolution, i.e., a continuous surface at each point thereof the ratio of the quantity of distributed material flowing through said point per unit of time of the quantity of the gaseous material of the stream flowing through the same point during the same unit of time is the same.

The above objects are attained by a structure providing for the self-formation of said gaseous stream into a free vortex according to the speed potential law governing this kind of flow and by supplying close to the axis of said free vortex and with a quite slow speed the material to be distributed in the stream.

A still more particular object of my invention is, when the material to be distributed is a liquid, to pulverize this liquid material without pressurizing it before, merely using therefor the high speed of rotation of a free vortex core quite close to its axis, thereby using part of the vortex kinetic rotary energy which is produced by a self-transformation of its pressure which may fall below the atmospheric pressure in some instances. A specific object of my invention is then to use as pulverizing energy a portion of the potential energy or enthalpy of the stream gaseous material at atmospheric pressure.

A still further object is to use the reduced pressure prevailing in the core of the vortex to cause the material to be distributed to flow into the gaseous stream, i.e., to be the determining cause of this flow of the material to be distributed, which otherwise, i.e., without the assistance of said reduced pressure would not flow into the stream.

A more specific object of my invention is the provision of a burner which will be capable of burning conveniently heavy, thick or muddy fuels, comminuted solid material such as, for instance, pulverized coal, combustible waste materials such as for instance saw dust, oily waste material in oil distilleries, and so on. More particularly my invention aims therefore to provide a burner having as fuel supplying means into a gaseous vortex stream a mere duct having a discharge orifice substantial cross-section not liable to be easily clogged up, i.e., a discharge orifice the cross section of which will be not less than half of a square inch and preferably more than one square inch.

Further objects and features of my invention will appear from the following description of an embodiment thereof illustrated diagrammatically in the annexed drawings in which:

FIG. 1 is a front view, with partial cutaway, of a burner with two concentric spiral chambers designed so that the two concentric streams emerging from them should gyrate in opposite directions;

FIG. 2 is a corresponding side-view;

FIG. 3 is a schematic illustration of a further embodiment.

Referring now to the embodiment shown in FIGS. 1 and 2, the burner comprises a chamber 1 provided with an orifice 2, cross-sections of which chamber through planes perpendicular to the axis of this orifice constitute logarithmic spirals the pole of which is located on the axis of the orifice 2. On one side of this chamber 1, and in the present instance adjacent to it, is arranged a chamber 3, also of spiral contour, having its pole located on the axis of the orifice 2 and provided with an orifice 4 which is coaxial with the orifice 2 and of large diameter than the latter. The orifice 4 is provided with an extension tube 5 which is initially cylindrical but which subsequently spreads outwards. The chamber 3 is crossed from end to end by a tube 6 which first comprises a cylindrical portion forming an axial extension of the orifice 2 and then a conical portion which terminates inside the tube 5. This tube 6 and the chamber 1 are crossed axially from end to end by a pipe 7 which terminates close to the extremity of the tube 6 and which extends outwards of the chamber 1 before dipping into a tank 9 for containing the liquid fuel to feed the burner. This tank 9 may either be independent of the chamber 1 or, on the contrary, be integral therewith.

These two chambers 1 and 3 communicate with the outside via conduits 11, 12, each of which is connected up with the respective chamber forming its extension in such a way as to be tangential or substantially tangential to the contour of the chamber. These two conduits 11 and 12 are attached to the outlet of the delivery volute of a fan 13 driven by a motor 14. In addition, a pipe 15 connects up this volute with the interior of the tank 9, thereby causing a pressure equal to the delivery pressure of the fan 13 to prevail in said tank. Lastly, there is arranged, downstream of the tube 5, a tube 16 of much larger diameter.

This being so, the air delivered through the conduit 11 into the chamber 1 emerges from the latter by the orifice 2 in the form of a free vortex stream having a strong axial depression and circulates in this form in the conduit 6 whereas, as a consequence of this axial depression which exerts its effect on the extremity of the pipe 7, the liquid contained in the tank 9 circulates within this pipe 7, and emerges from the extremity thereof when it is immediately atomized and vaporized in the midst of the eddying stream under the effect of the low pressure prevailing therein, of centrifugal force, of the steep pressure gradient across this stream and of the very high speed of rotation of the free vortex, adjacent its axis. On the other hand, the air delivered through the conduit 12 emerges from the orifice 4 likewise in the form of a vortex stream and, in this case, the two chambers 1 and 3 are arranged so that the air streams emerging from orifices 2 and 4 respectively should gyrate in opposite directions to each other; in other words, the spiral walls of these two chambers move away from the axis by rotating in opposite directions (FIG. 2). The annular stream emerging through the orifice 4 envelops the central vortex which emerges from the tube 6 and activates combustion in the peripheral zone of this latter stream, namely in the zone where the liquid particles not yet vaporized tend to accumulate under the effect of centrifugal force. It also exerts a transient checking effect on this centrifugalization by virtue of the fact that, on passing from one stream to the other, the particles are subjected to the reversal of their direction of rotation, so that their rotational speed is first lowered to nil. As for the tube 16, it prevents a too rapid crosswise development of the stream, so that combustion develops under favourable conditions and produces a short flame (of a length of a few-half-score centimetres) of high radiation power.

The burner shown in FIG. 3 differs from that in FIG. 2 merely in the way in which the enveloping annular stream is produced. The chamber 3b which produces this enveloping stream is not connected to the delivery orifice 13b of the fan but communicates with the open air via the conduit 12b, so that air circulation in this chamber 3b is obtained by the suction effect exerted within the tube 5 by the central stream emerging from the conduit 6.

Critical data are to be observed to attain the objects set forth here above, namely: the speed of rotation of the vortex at the point of discharge of the fuel must not be less than fifty meters and preferably not less than eighty meters and more when liquid fuel is to be pulverized; the ratio between the flow cross-sections of the inlet and outlet of the spiral chamber 1 must be comprised between 1 and 1.5 to provide a free vortex having a highly revolving core quite close to the axis; the length of the inlet of the vortex forming chamber 1 perpendicularly to the outlet axis, or vortex axis, must be less than half the diameter of this circular outlet, and preferably substantially equal to one third of said diameter.

My invention is not limited to the use of spiral chambers for the formation of a gaseous free vortex. Other known means may be used, for instance mere cylindrical or conical ducts provided with a tangential inlet and having circular outlet, whether of restricted cross-section or not.

When the material to be distributed consists of solid particles the material supplying tube may have its discharge orifice provided in the vortex forming body such as 1, more or less close to the bottom thereof other than that provided with the circular outlet.

What I claim is:

1. In an assembly for distributing material of the nature of a fluid or fluidified material in a gaseous stream, wall means providing a mixing chamber with such chamber having a circular inlet at one end thereof, means connected to the inlet adapted to form a gaseous flow into a free vortex and introducing it into said chamber through the inlet, said introducing means including wall means forming a chamber having a circular orifice coaxial to said inlet and an inlet arranged to provide for a gaseous flow directed transversely of the axis of said circular orifice, thereby to form a gaseous flow entering said chamber into said free vortex, means to force a gaseous flow into said chamber through said inlet and duct means having a discharge orifice of relatively large cross-section located quite close to the axis of said circular orifice to supply into said free vortex said material to be distributed, said supply taking place without said material being pressurized before and the reduced pressure prevailing in the core of said free vortex being the determining causal force of the flow of said material through said duct means.

2. The assembly as claimed in claim 1 in which the discharge orifice of said duct means has a cross-sectional area greater than half a square inch.

3. The assembly as claimed in claim 1, wherein the discharge orifice of said duct means has a cross-sectional area greater than one square inch to supply a material of the nature of a heavy, thick or muddy liquid.

4. The assembly as in claim 1, wherein said material to be distributed is a liquid and the orifice of said duct means is located at the inlet of said mixing chamber.

5. The assembly as claimed in claim 1, wherein the material to be distributed consisting of solid particles, the discharge orifice of said duct means is located within said free vortex forming chamber.

6. The assembly as claimed in claim 1, wherein the ratio of the cross-sectional area of said inlet into the free vortex forming chamber and that of the outlet of the latter is comprised between 1 and 1.5.

References Cited

UNITED STATES PATENTS 2,097,255 10/1937 Saba _____ 158—1.5 X
2,565,879 8/1951 Perle _____ 158—1.5 X

FOREIGN PATENTS 612,699 8/1926 France.

M. HENSON WOOD, Jr., *Primary Examiner.*

V. M. WIGMAN, *Assistant Examiner.*